United States Patent
Bong et al.

(10) Patent No.: US 7,969,752 B2
(45) Date of Patent: Jun. 28, 2011

(54) SWITCHING POWER SUPPLY DEVICE USING CURRENT SHARING TRANSFORMER

(75) Inventors: Sang Cheol Bong, Suwon-si (KR); Tae Young Ahn, Cheongju-si (KR); Don Sik Kim, Gunpo-si (KR); Hak Ryong Kim, Suwon-si (KR); Myung Hyun Sung, Seoul (KR); Do Heung Na, Suwon-si (KR); Jong Pil Kim, Gwacheon-si (KR); Dong Joong Kim, Suwon-si (KR); Tae Won Heo, Suwon-si (KR); Dong Wook Lee, Yongin-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 549 days.

(21) Appl. No.: 12/113,648

(22) Filed: May 1, 2008

(65) Prior Publication Data

US 2009/0231884 A1    Sep. 17, 2009

(30) Foreign Application Priority Data

Mar. 14, 2008  (KR) .................. 10-2008-0023890

(51) Int. Cl.
*H02M 3/335*    (2006.01)
(52) U.S. Cl. ........................................ 363/17
(58) Field of Classification Search ............ 363/17, 363/21.04, 21.06, 21.1
See application file for complete search history.

(56) References Cited

U.S. PATENT DOCUMENTS

| | | | | | |
|---|---|---|---|---|---|
| 4,204,147 | A | * | 5/1980 | Larrabee | 323/257 |
| 4,525,774 | A | * | 6/1985 | Kino et al. | 363/17 |
| 4,665,473 | A | * | 5/1987 | Onda et al. | 363/21.04 |
| 4,825,348 | A | * | 4/1989 | Steigerwald et al. | 363/17 |
| 5,754,413 | A | * | 5/1998 | Fraidlin et al. | 363/16 |
| 6,388,898 | B1 | * | 5/2002 | Fan et al. | 363/20 |
| 6,765,810 | B2 | * | 7/2004 | Perry | 363/21.06 |
| 7,154,763 | B2 | * | 12/2006 | Yamada et al. | 363/16 |
| 2008/0278969 | A1 | * | 11/2008 | Bolz et al. | 363/17 |
| 2009/0231884 | A1 | * | 9/2009 | Bong et al. | 363/17 |
| 2010/0097826 | A1 | * | 4/2010 | Xu et al. | 363/17 |
| 2010/0128498 | A1 | * | 5/2010 | Nymand | 363/17 |

FOREIGN PATENT DOCUMENTS

JP   2006-139941 A2   6/2006
KR   10-2002-0040465 A   5/2002

* cited by examiner

*Primary Examiner* — Jeffrey L Sterrett
(74) *Attorney, Agent, or Firm* — Lowe, Hauptman, Ham & Berner, LLP

(57) ABSTRACT

In accordance with the present invention, the switching power supply device using a current sharing transformer includes an inverter switching unit for switching an input voltage; a set of share inductors connected to the inverter switching unit for distributing a current applied by the inverter switching unit; first and second transformers of which each primary side connected to the set of share inductors is connected in parallel to each other; and a rectifying unit connected to secondary sides of the first and second transformers.

16 Claims, 6 Drawing Sheets

[FIG. 1]
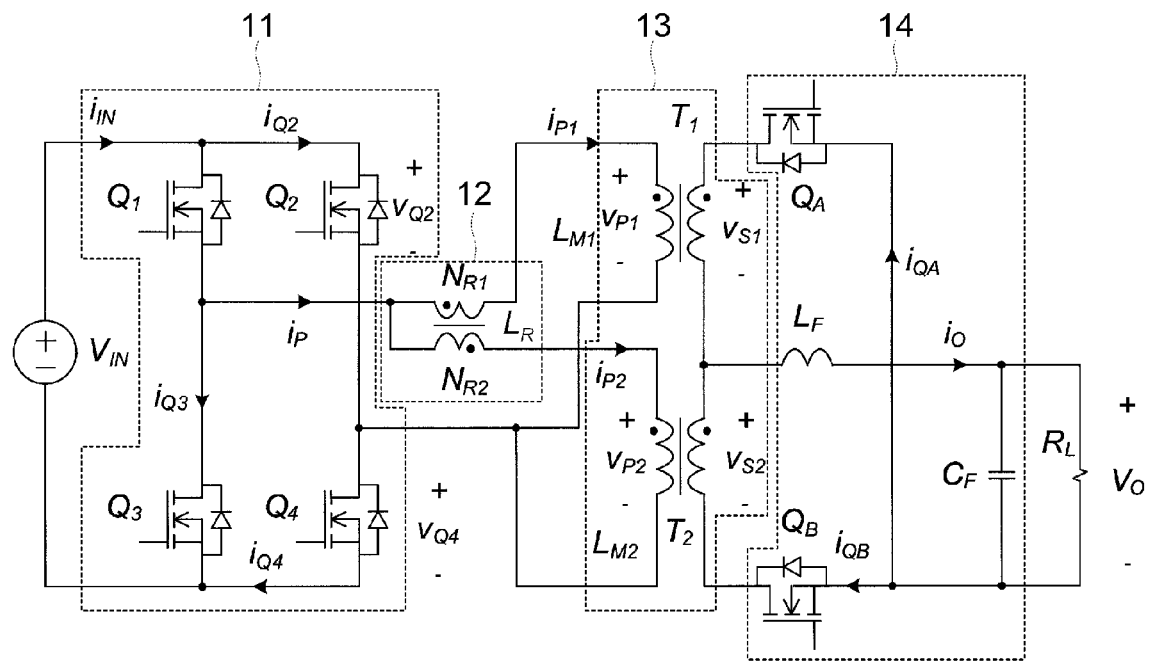

[FIG. 2]
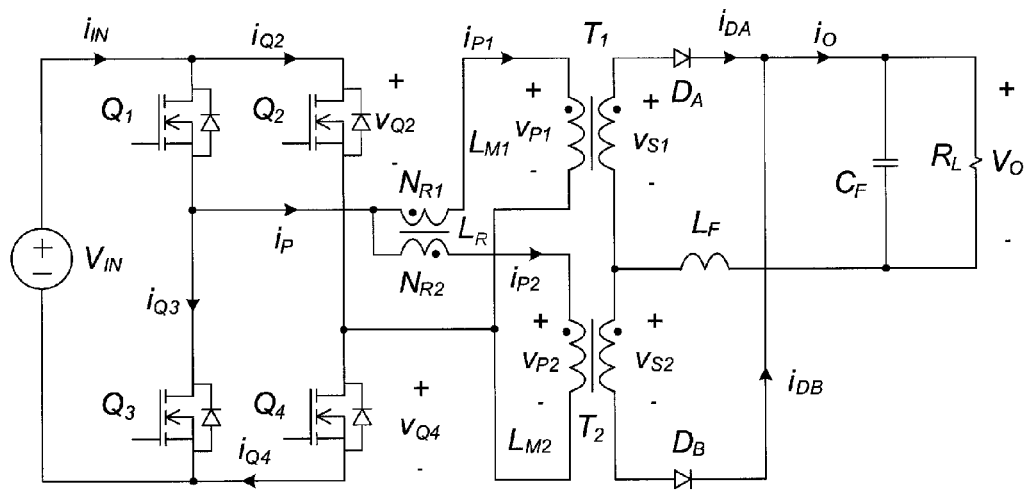
[FIG. 3]
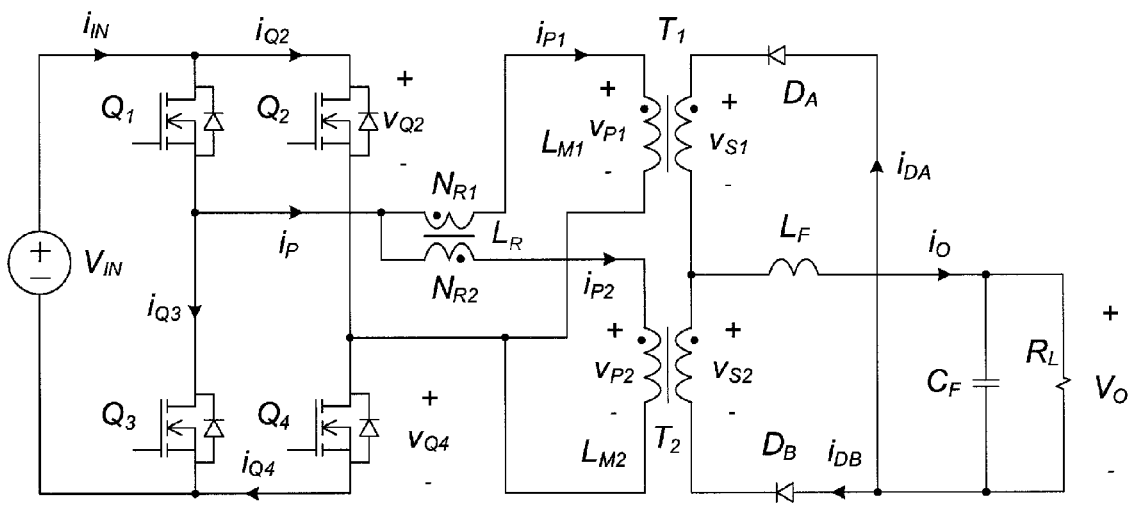

[FIG. 4]
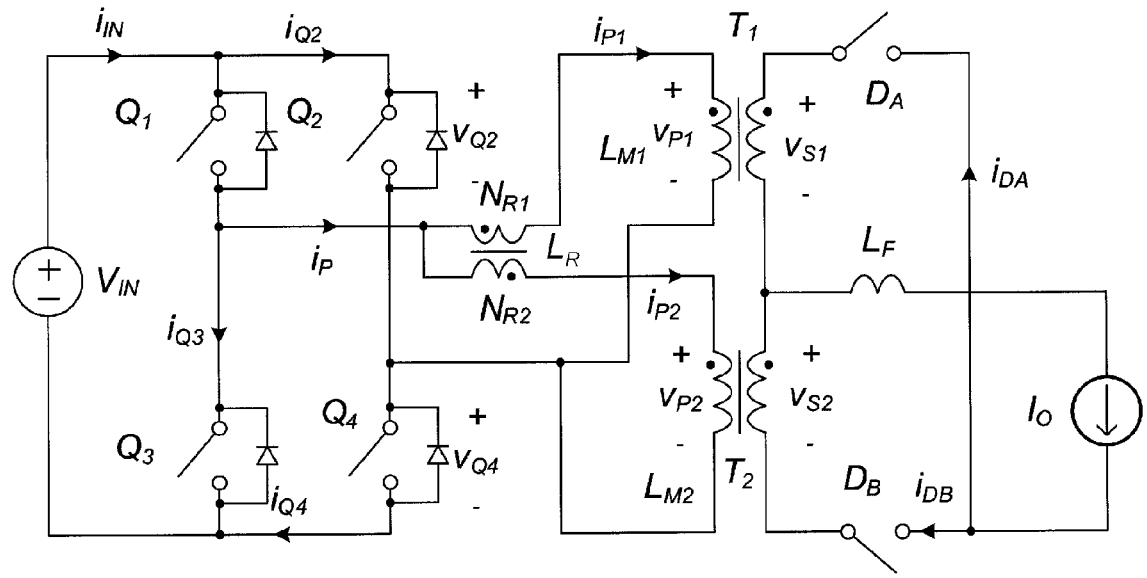
[FIG. 5]
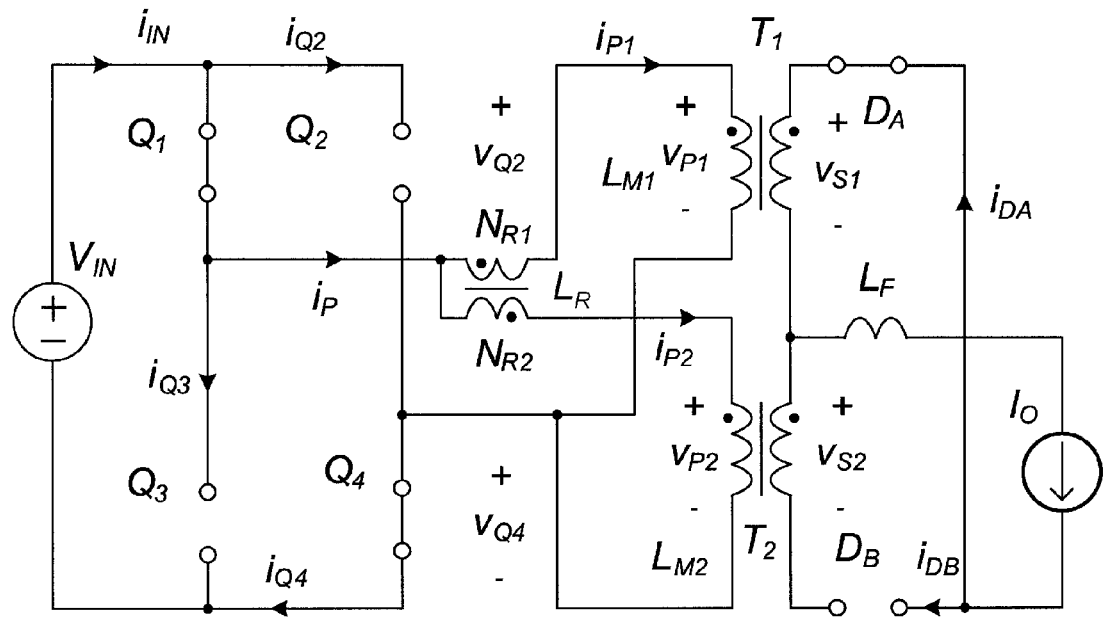

[FIG. 6]
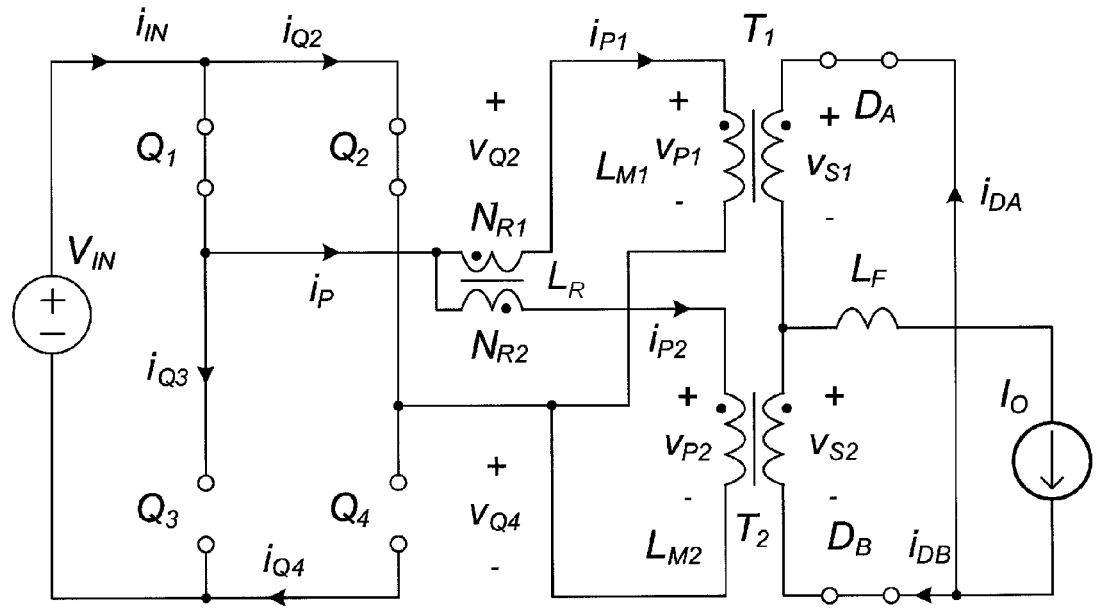
[FIG. 7]
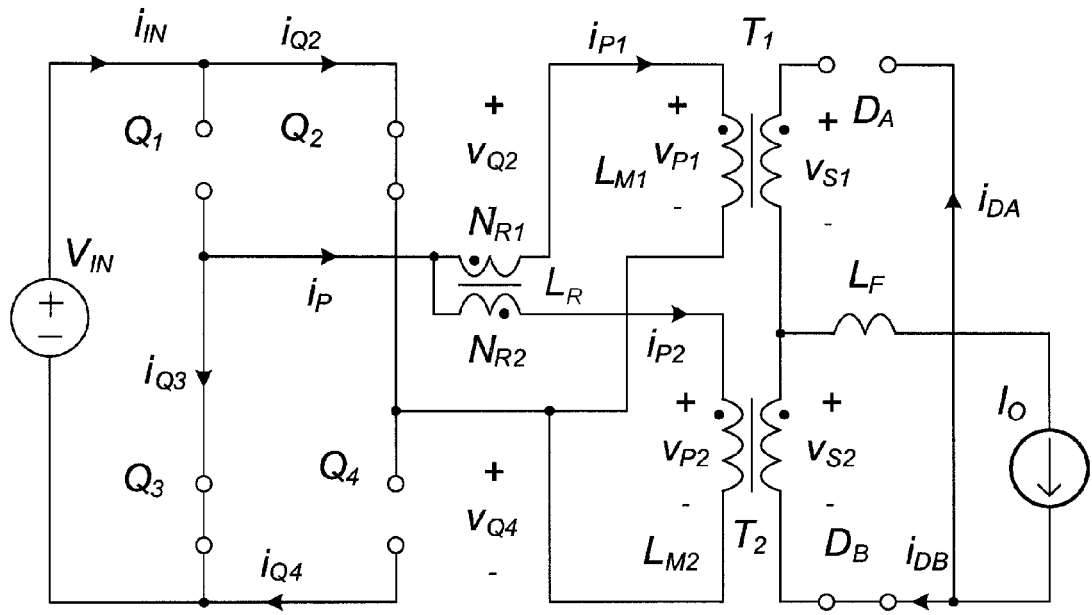

[FIG. 8]
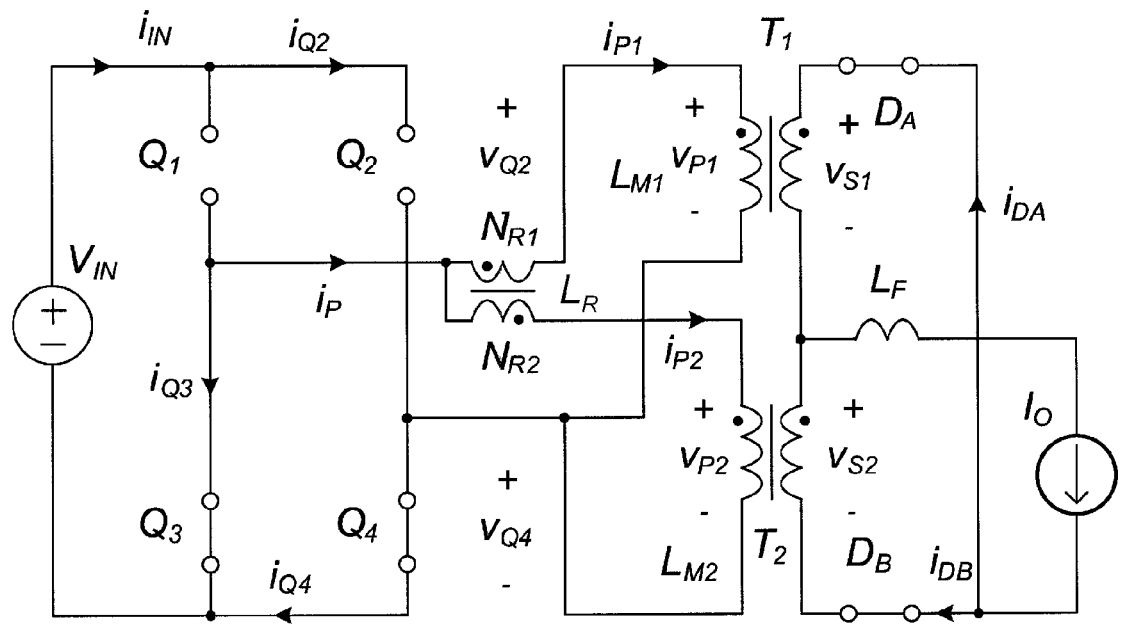

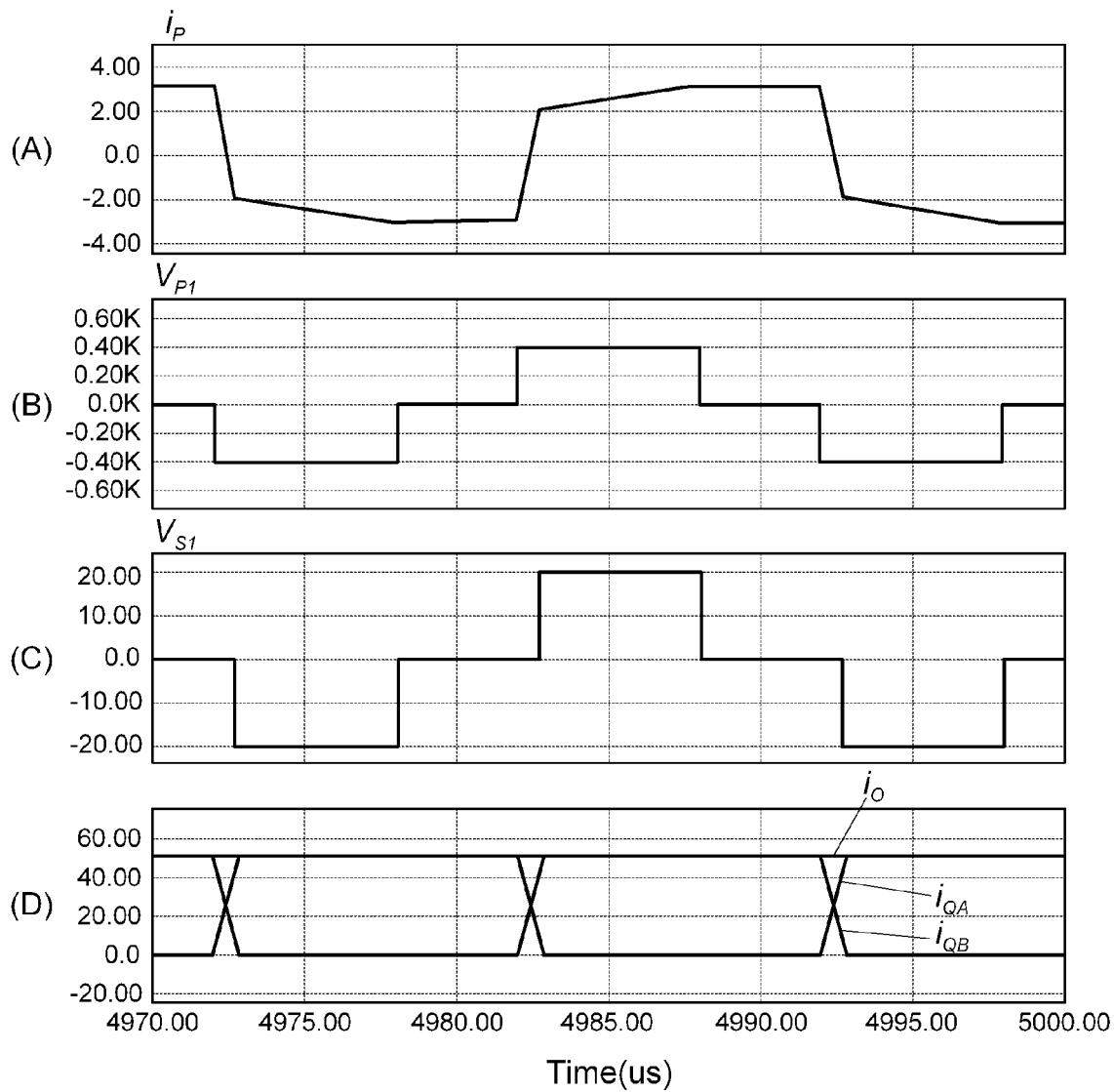

SWITCHING POWER SUPPLY DEVICE USING CURRENT SHARING TRANSFORMER

CROSS-REFERENCE TO RELATED APPLICATIONS

This application claims the benefit of Korean Patent Application No. 10-2008-0023890 filed with the Korea Intellectual Property Office on Mar. 14, 2008, the disclosure of which is incorporated herein by reference.

BACKGROUND OF THE INVENTION

1. Field of the Invention

The present invention relates to a switching power supply device; and, more particularly, to a switching power supply device using a current sharing transformer.

2. Description of the Related Art

Recently, functions of electronic and electric equipment or the like required by consumers have been increased, and thus the electronic and electric equipment has been more digitized with using a microcomputer and a processor. Therefore, a power supply device with a small size and high efficiency in each product has been urgently required for service to satisfy various needs of the consumers. In general, a switching power supply device reducing a manufacturing cost and widely used as a basic circuit type of the power supply device uses a switching type, thereby reducing occurrence of loss and being downsized.

In general, because the switching power supply device converts much power with supplying a stable voltage, power loss is inevitably generated. Because most of the loss generated inside is discharged as heat and when power conversion efficiency is reduced, heat generation is increased in proportion to the reduced power conversion efficiency to sometimes shorten a lifetime of a product. Further, in the case of a high-capacitive power supply device used in a midsize and large computer used for server or high-speed operation and large-scale information processing, a size of the power supply device as well as the power conversion efficiency are limited and therefore a design and a manufacturing method to reduce volume and weight in a product development stage have been urgently needed.

A value as a result of dividing a power capacity by a volume of a power supply device product is generally referred to as a power density. That the power density is high means that the product has more power capacity in comparison with an external size thereof and a possibility to make a system smaller is higher. Generally, there are largely three methods to increase the power density. Firstly, it is a method to increase a switching frequency. When increasing the switching frequency, sizes of elements sensitive to the frequency are varied. It is possible to downsize power storage elements such as a transformer and a capacitor because burden on energy storage is reduced when the frequency is increased, thus making the product smaller. Secondary, it is another method to improve the power conversion efficiency. When the power conversion efficiency is increased, an amount of heat generation is reduced and then a size of a heat sink or a conductor is reduced to downsize the power supply device. Lastly, it is still another method to use a construction method and an optimal arrangement technique of the product. To configure and arrange hundreds of elements used in the power supply device in an optimal state is closely related to the downsizing and the reliability of the product and particularly, the configuration and the arrangement of elements utilizing magnetic cores such as a transformer and an inductor give rise to a very important result

SUMMARY OF THE INVENTION

It is a main object of the present invention to provide a switching supply device capable of improving current distribution function of a set of share inductors and power conversion efficiency by using two transformers of which primary sides are connected in parallel.

An object of the present invention can be achieved by providing a switch power supply device using a current sharing transformer includes an inverter switching unit for switching an input voltage; a set of share inductors connected to the inverter switching unit for distributing a current applied by the inverter switching unit; first and second transformers of which each primary side connected to the set of share inductors is connected in parallel to each other; and a rectifying unit connected to secondary sides of the first and second transformers.

In accordance with the present invention, the inverter switching unit performs switching operation through phase control PWM (Pulse Width Modulation) control.

In accordance with the present invention, the inverter switching unit has four switches and may be a structure selected from a group consisting of a full bridge structure, a symmetric half-bridge structure, an asymmetric half-bridge structure and an active clamp type forward converter structure.

In accordance with the present invention, the inverter switching unit may be a forward converter structure with two switches.

In accordance with the present invention, the set of share inductors includes a first share inductor of which one end is connected to the inverter switching unit and the other end thereof is connected to a primary side of the first transformer; and a second share inductor of which one end is connected to the inverter switching unit and the other end thereof is connected to a primary side of the second transformer, wherein the one end of the first share inductor connected to the inverter switching unit and the one end of the second share inductor connected to the inverter switching unit are connected to each other.

In accordance with the present invention, the first and second share inductors have the same impedance.

In accordance with the present invention, a minus (−) terminal of a secondary side of the first transformer and a plus (+) terminal of a secondary side of the second transformer are connected to each other.

In accordance with the present invention, the rectifying unit includes a first rectifying switch connected to the plus terminal of the secondary side of the first transformer; an inductor and a capacitor in series connected to a contact point at which the minus terminal of the secondary side of the first transformer and the plus terminal of the secondary side of the second transformer are connected to each other; and a second rectifying switch connected to the minus terminal of the secondary side of the second transformer.

In accordance with the present invention, the first and second rectifying switches may be switches for a synchronous rectifier.

In accordance with the present invention, the first and second rectifying switches may be diode rectifiers.

In accordance with the present invention, the rectifying unit may have a structure of a voltage-doubler rectifier.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a circuit diagram of a switching power supply device using a current sharing transformer in accordance with another embodiment of the present invention;

FIG. 2 is a circuit diagram of a switching power supply device using a diode rectifier in accordance with another embodiment of the present invention;

FIG. 3 is a circuit diagram of a switching power supply device using a diode rectifier in accordance with still another embodiment of the present invention FIG. 4 is an equivalent circuit diagram showing the circuit diagram of the switching power supply device using the current sharing transformer in FIG. 3 by using an erroneous switch and a constant current source;

FIG. 5 is a circuit diagram illustrating a configuration of a circuit and a switching state when semiconductor switches Q1 and Q4 of semiconductor switches Q1~Q4 of an inverter switching unit 11 are conducted;

FIG. 6 is a circuit diagram illustrating a configuration of a circuit and a switching state when semiconductor switches Q1 and Q2 of the semiconductor switches Q1~Q4 of the inverter switching unit 11 are conducted;

FIG. 7 is a circuit diagram illustrating a configuration of a circuit and a switching state when semiconductor switches Q2 and Q3 of the semiconductor switches Q1~Q4 of the inverter switching unit 11 are conducted;

FIG. 8 is a circuit diagram illustrating a configuration of a circuit and a switching state when semiconductor switches Q3 and Q4 of the semiconductor switches Q1~Q4 of the inverter switching unit 11 are conducted; and FIG. 9 is a diagram illustrating a result of simulating a circuit of the switching power supply device using the current sharing transformer in FIG. 1 by using a PSIM program.

DETAILED DESCRIPTION OF THE PREFERRED EMBODIMENTS

Hereinafter, the present invention will be appreciated clearly through the following detailed description with reference to the accompanying drawings illustrating preferable embodiments of the present invention. However, the present invention may be modified in various types and the scope of the present invention will not be limited to the follow embodiments. The embodiments of the present invention are provided to more completely describe the present invention to those skilled in the art. Therefore, the shapes and sizes of components in the drawings may be overdrawn for more clear description and the same component is represented by the same reference numeral.

FIG. 1 is a circuit diagram illustrating a switching power supply device using a current sharing transformer in accordance with one embodiment of the present invention.

Referring to FIG. 1, the switching power supply device using the current sharing transformer may include an inverter switching unit 11, a set of share inductors 12, two parallel transformers 13 with a first transformer T1 and a second transformer T2, and a rectifying unit 14.

The inverter switching unit 11 is positioned on a stage following an input power and switches a DC input voltage applied by an input power through four switches of a full bridge structure. Generally, because the full bridge structure is a circuit type with highest power conversion capacity in the switching power supply device, the inverter switching unit 11 in FIG. 1 is represented by the full bridge structure. However, the inverter switching unit 11 does not have necessarily the full bridge structure and all general inverter construction circuits may be used. For example, a symmetric half bridge, an asymmetric half bridge, an active clamp type forward converter, a forward converter with two switches, or the like may be used.

The inverter switching unit 11 performs switching operation by properly being controlled and regulated through a predetermined PWM (Pulse Width Modulation) switching pattern to apply an AC type voltage to the transformer. Particularly, in recent years, phase control PWM control capable of soft-switching or zero-voltage-switching may be used to reduce switching loss and improve an EMI characteristic.

The set of share inductors 12 includes a first share inductor and a second share inductor. One end of the first share inductor is connected to the inverter switching unit 11 and the other end thereof is connected to a primary side of the first transformer T1. One end of the second share inductor is connected to the inverter switching unit 11 and the other end thereof is connected to a primary side of the second transformer T2. Further, the one end of the first share inductor connected to the inverter switching unit 11 and the one end of the second share inductor connected to the inverter switching unit 11 are connected to each other.

The two parallel transformers 13 include the first transformer T1 and the second transformer T2 and each of the primary sides thereof connected to the set of share inductors 12 is connected in parallel to each other. Further, a minus (−) terminal of a secondary side of the first transformer T1 and a plus (+) terminal of a secondary side of the second transformer T2 are connected to each other.

The rectifying unit 14 includes a first rectifying switch QA, a second rectifying switch QB, an inductor LF and a capacitor CF. The first rectifying switch QA is connected to the plus terminal of the secondary side of the first transformer T1 and the second rectifying switch QB is connected to the minus terminal of the secondary side of the second transformer T2. Further, the inductor LF and the capacitor CF for filter are connected in series to a contact point at which the minus terminal of the secondary side of the first transformer T1 and the plus terminal of the secondary side of the second transformer T2 are connected to each other.

In the case of operation of the circuit diagram of the switching power supply device using the current sharing transformer in FIG. 1, the inverter switching unit 11 applied with the input voltage by the input power switches the DC voltage into an AC voltage by high frequency switching operation. The switched AC voltage is classified into two currents ip1 and ip2 by the set of share inductors 12. The first share inductor has a winding ratio of NR1 and the second share inductor has a winding ration of NR2 and when the winding ratios of the two currents are same, the first and second share inductors have the same impedance. Meanwhile, as shown in FIG. 1, the two currents ip1 and ip2 are distributed by the impedance ratio, and therefore the amperage of the currents ip1 and ip2 are necessarily the same.

Further, the currents ip1 and ip2 divided into two are applied to the two parallel transformers 13 and the secondary sides of the two parallel transformers 13 are designed to have a voltage-doubler rectifier structure with a center tap. In general, a double current rectifier is one of frequently used circuit types because winding of a secondary side of a transformer is simple to downsize the transformer. Because of current distribution function of the set of share inductors 12, the same amount of current always flows in the first and second transformers T1 and T2 and particularly and particularly, although there is somewhat error of an inductance such as a winding ratio, the same current and voltage are distributed. Accordingly, there is an advantage that even in a transient state of the power supply device, function of distributing the current the same is maintained to improve reliability of the power supply device. The two switches QA and QB for rectifying an AC type voltage from output of the two parallel transformers 13 are switches for a synchronous rectifier to reduce conduction loss of the rectifier and enable rectification operation by proper switching control outside. The inductor LF and the capacitor CF for filter convert the voltage rectified by the two switches QA and QB into a DC voltage.

As shown in FIG. 2, in the switching power supply device using the current sharing transformer in accordance with one embodiment of the present invention, the two switches for a synchronous rectifier QA and QB of the rectifying unit 14 are substituted with two diode rectifiers DA and DB. Particularly, a direction of the two diode rectifiers DA and DB faces a load (an anode is connected to the secondary side of the transformer) to be a type to induce a minus terminal of an output stage from a transformer tap as a contact point at which the minus terminal of the secondary side of the first transformer T1 and the plus terminal of the secondary side of the second transformer T2 are connected to each other.

As shown in FIG. 3, in the switching power supply device using the current sharing transformer in accordance with another embodiment of the present invention, the two switches for a synchronous rectifier QA and QB of the rectifying unit 14 are substituted with two diode rectifiers DA and DB. Particularly, a direction of the two diode rectifiers DA and DB faces the transformers (a cathode is connected to the secondary side of the transformer) to be a type to induce a minus terminal of an output stage from a lower stage of the transformer.

FIG. 4 is an equivalent circuit diagram showing the circuit diagram of the switching power supply device using the current sharing transformer in FIG. 3 by using an erroneous switch and a constant current source. In a circuit in FIG. 4, four semiconductor switches Q1~Q4 of the inverter switching unit 11 and two diode rectifiers DA and DB of the rectifying unit 14 are equivalently converted into erroneous switches and assuming that the capacitor CF for filter of the rectifying unit 14 has a large capacitor value, the capacitor CF is equivalently converted into a constant current source.

FIG. 5 is a circuit diagram of the switching power supply device using the current sharing transformer in accordance with still another embodiment of the present invention illustrating a configuration of a circuit and a switching state when semiconductor switches Q1 and Q4 of semiconductor switches Q1~Q4 of the inverter switching unit 11 are conducted.

When the semiconductor switches Q1 and Q4 of the inverter switching unit 11 are conducted, the current switched into the AC by the high frequency switching operation is distributed into the same currents by the set of share inductors 12 and applied to the primary sides of the two parallel transformers 13, whereby only the diode rectifying unit DA connected to the secondary side of the first transformer T1 of the rectifying unit 14 is conducted to perform a rectification function.

FIG. 6 is a circuit diagram of the switching power supply device using the current sharing transformer in accordance with still another embodiment of the present invention illustrating a configuration of a circuit and a switching state when the semiconductor switches Q1 and Q2 of the semiconductor switches Q1~Q4 of the inverter switching unit 11 are conducted.

When the semiconductor switches Q1 and Q2 of the inverter switching unit 11 are conducted, the current switched into the AC by the high frequency switching operation is distributed into the same currents by the set of share inductors 12 and applied to the primary sides of the two parallel transformers 13, whereby the diode rectifying unit DA connected to the secondary side of the first transformer T1 of the rectifying unit 14 and the diode rectifying unit DB connected to the secondary side of the second transformer T2 are conducted to perform the rectification function.

FIG. 7 is a circuit diagram of the switching power supply device using the current sharing transformer in accordance with still another embodiment of the present invention illustrating a configuration of a circuit and a switching state when semiconductor switches Q2 and Q3 of the semiconductor switches Q1~Q4 of the inverter switching unit 11 are conducted.

When the semiconductor switches Q2 and Q3 of the inverter switching unit 11 are conducted, the current switched into the AC by the high frequency switching operation is distributed into the same currents by the set of share inductors 12 and applied to the primary sides of the two parallel transformers 13, whereby only the diode rectifying unit DB connected to the secondary side of the second transformer T2 of the rectifying unit 14 is conducted to perform the rectification function.

FIG. 8 is a circuit diagram of the switching power supply device using the current sharing transformer in accordance with still another embodiment of the present invention illustrating a configuration of a circuit and a switching state when semiconductor switches Q3 and Q4 of the semiconductor switches Q1~Q4 of the inverter switching unit 11 are conducted.

When the semiconductor switches Q3 and Q4 of the inverter switching unit 11 are conducted, the current switched into the AC by the high frequency switching operation is distributed into the same currents by the set of share inductors 12 and applied to the primary sides of the two parallel transformers 13, whereby the diode rectifying unit DA connected to the secondary side of the first transformer T1 of the rectifying unit 14 and the diode rectifying unit DB connected to the secondary side of the second transformer T2 are conducted to perform the rectification function.

FIG. 9 is a diagram illustrating a result of simulating a circuit of the switching power supply device using the current sharing transformer in FIG. 1 by using a PSIM program.

FIG. 9(a) represents a current ip passing through the inverter switching unit 11, distributed through the set of share inductors 12 and applied to the transformers. The current ip is what the DC voltage applied from the input power is converted into an AC type by the high frequency switching operation of the inverter switching unit 11.

FIG. 9(b) represents a voltage Vp1 of a primary side of the first transformer T1. The voltage Vp1 of the primary side of the first transformer T1 is an AC type voltage representing about the same waveform as the current ip in FIG. 9(a).

FIG. 9(c) represents a voltage Vs1 of a secondary side of the first transformer T1. The voltage Vs1 of the secondary side of the first transformer T1 is an AC type voltage representing about the same waveform as the current ip in FIG. 9(a).

FIG. 9(d) represents currents iQA and iQB of the two rectifying switches of the rectifying unit 14 and an output current io of the inductor LF for a filter. Through the currents iQA and iQB, it is possible to know that any one of the two rectifying switches or both the two rectifying switches are conducted according to a conduction section of each of the semiconductor switches of the inverter switching unit 11 to perform a rectification function. The output current io of the inductor LF for the filter is converted into a DC current by the inductor LF for the filter as the two rectifying switches perform the rectification function.

As described above, in accordance with the present invention, the switching power supply device using the current sharing transformer is capable of performing a zero-voltage switching by using the set of share inductors so as to reduce switching loss and finally improving an EMI (Electro Magnetic Interference) characteristic and power conversion efficiency by implementing a soft switching operation.

As described above, although a few preferable embodiments of the present invention have been shown and described, it will be appreciated by those skilled in the art that substitutions, modifications and changes may be made in these embodiments without departing from the principles and spirit of the general inventive concept, the scope of which is defined in the appended claims and their equivalents.

What is claimed is:

1. A switching power supply device using a current sharing transformer comprising:
   an inverter switching unit for switching an input voltage;
   a set of share inductors connected to the inverter switching unit for distributing a current supplied by the inverter switching unit;
   a first transformer and a second transformer each having a primary side connected to the set of share inductors, and the primary sides of the first and second transformers being connected in parallel to each other; and
   a rectifying unit connected to secondary sides of the first and second transformers,
   wherein the set of share inductors comprises:
      a first share inductor of which one end is connected to the inverter switching unit and the other end thereof is connected to the primary side of the first transformer; and
      a second share inductor of which one end is connected to the inverter switching unit and the other end thereof is connected to the primary side of the second transformer,
      the one end of the first share inductor connected to the inverter switching unit and the one end of the second share inductor connected to the inverter switching unit being connected to each other.

2. The switching power supply device using the current sharing transformer according to claim 1, wherein the inverter switching unit performs switching operation by using phase control PWM control.

3. The switching power supply device using the current sharing transformer according to claim 1, wherein the inverter switching unit includes four switches and is a full bridge structure.

4. The switching power supply device using the current sharing transformer according to claim 1, wherein the first and second share inductors have the same impedance.

5. The switching power supply device using the current sharing transformer according to claim 1, wherein a minus(−) terminal of the secondary side of the first transformer and a plus(+) terminal of the secondary side of the second transformer are connected to each other.

6. The switching power supply device using the current sharing transformer according to claim 1, wherein the rectifying unit includes
   a first rectifying switch connected to the plus terminal of the secondary side of the first transformer;
   an inductor and a capacitor in series connected to a contact point at which the minus terminal of the secondary side of the first transformer and the plus terminal of the secondary side of the second transformer are connected to each other; and
   a second rectifying switch connected to the minus terminal of the secondary side of the second transformer.

7. The switching power supply device using the current sharing transformer according to claim 6, wherein the first and second rectifying switches are switches for a synchronous rectifier.

8. The switching power supply device using the current sharing transformer according to claim 6, wherein the first and second rectifying switches are diode rectifiers.

9. A switching power supply device comprising:
   an inverter switching unit configured to receive an input voltage;
   a first share inductor connected to a first node of the inverter switching unit;
   a second share inductor connected to the first node of the inverter switching unit;
   a first transformer having a first primary side connected between the first share inductor and a second node of the inverter switching unit;
   a second transformer having a second primary side connected between the second share inductor and the second node of the inverter switching unit; and
   a rectifying unit connected to secondary sides of the first and second transformers.

10. The switching power supply device of claim 9, wherein the rectifying unit comprises:
   a first rectifying switch connected to the plus terminal of the secondary side of the first transformer;
   an inductor and a capacitor in series connected to a contact point at which the minus terminal of the secondary side of the first transformer and the plus terminal of the secondary side of the second transformer are connected to each other; and
   a second rectifying switch connected to the minus terminal of the secondary side of the second transformer.

11. The switching power supply device of claim 10, wherein the first and second rectifying switches are switches for a synchronous rectifier.

12. The switching power supply device of claim 10, wherein the first and second rectifying switches are diode rectifiers.

13. The switching power supply device of claim 9, wherein the inverter switching unit is configured to perform switching operation by using phase control PWM control.

14. The switching power supply device of claim 9, wherein the inverter switching unit includes four switches arranged to have a full bridge structure.

15. The switching power supply device of claim 9, wherein the first and second share inductors have the same impedance.

16. The switching power supply device of claim 9, wherein a minus terminal of the secondary side of the first transformer and a plus terminal of the secondary side of the second transformer are connected to each other.

* * * * *